Nov. 14, 1944.  A. L. LANG  2,362,757
GREASE DISPOSAL MEANS FOR COOKING SURFACES
Filed Dec. 28, 1940  2 Sheets-Sheet 1
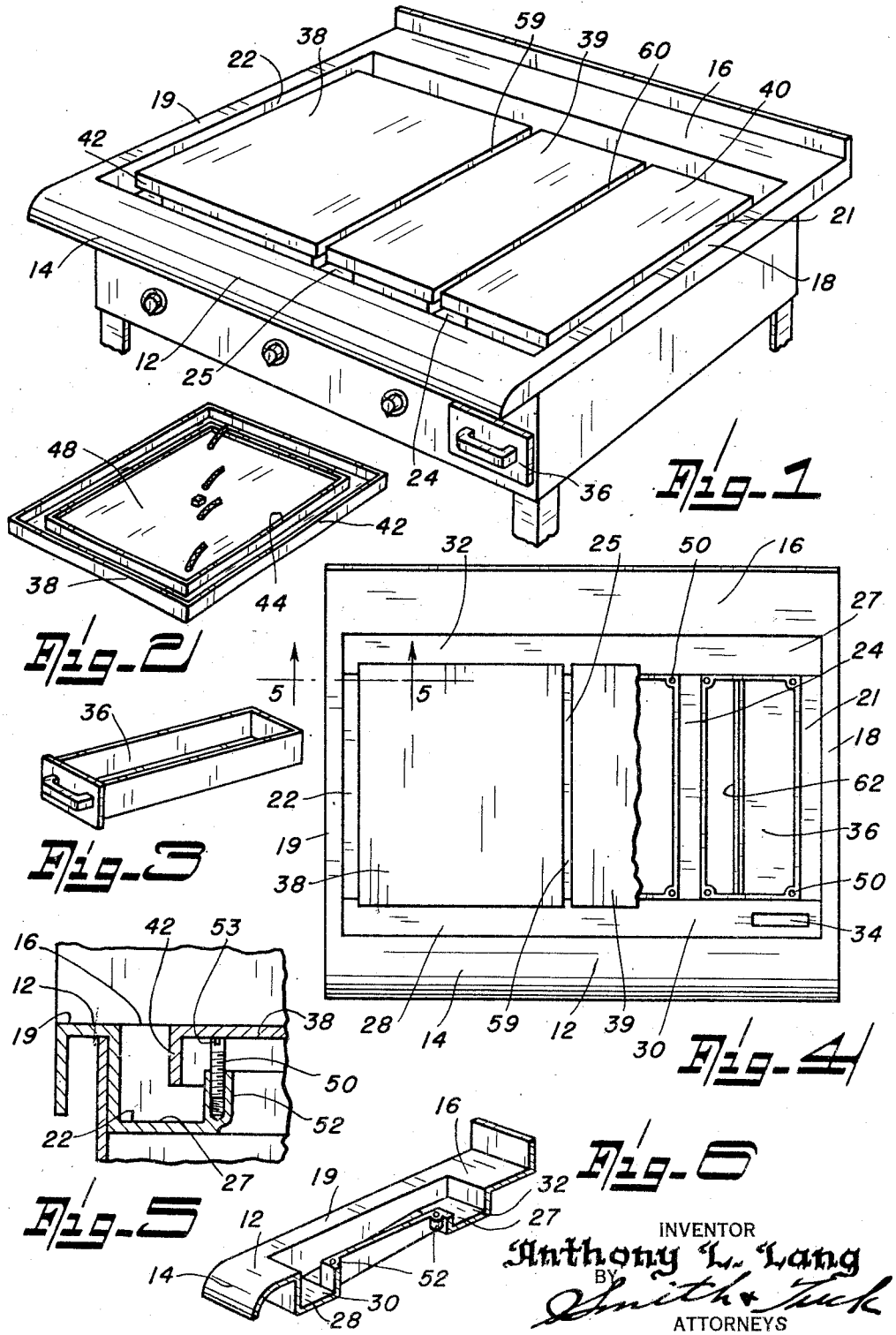
INVENTOR
Anthony L. Lang
BY
Smith & Tuck
ATTORNEYS

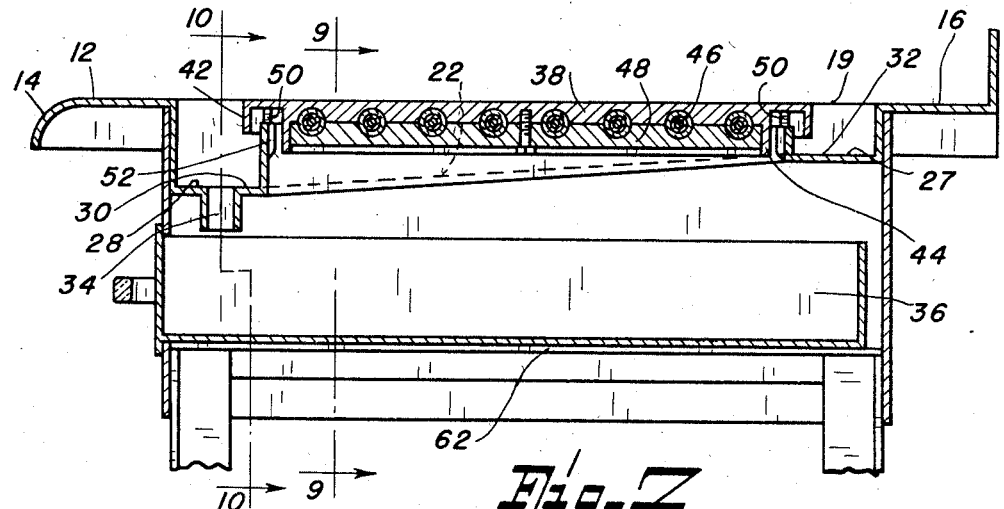
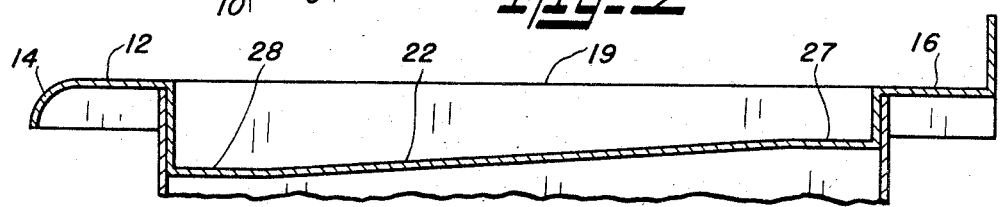
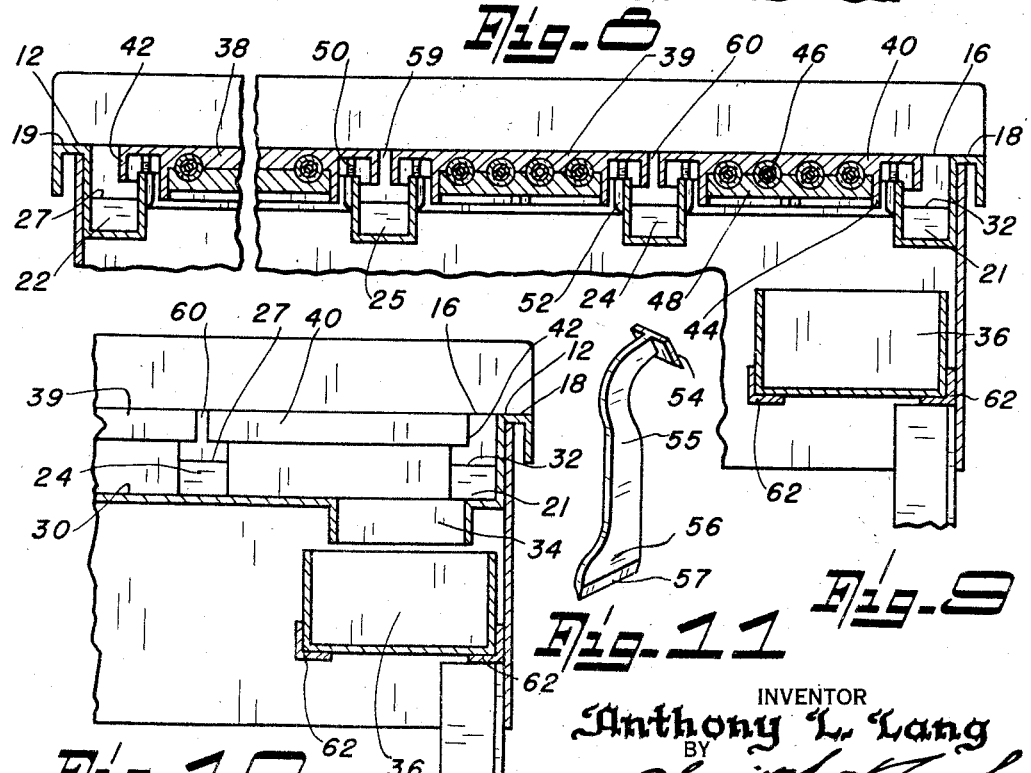

Patented Nov. 14, 1944

2,362,757

UNITED STATES PATENT OFFICE 2,362,757

GREASE DISPOSAL MEANS FOR COOKING SURFACES

Anthony L. Lang, Seattle, Wash.

Application December 28, 1940, Serial No. 372,089

2 Claims. (Cl. 99—422)

My present invention relates to the art of cooking stoves or hot plates, and more particularly to a grease disposal means for cooking surfaces.

My device consists essentially in providing a cooking top made, preferably, of a plurality of separate cooking surfaces which may be heated by any desired means; these sections have marginal flanges extending downwardly into troughs which are so arranged as to normally cause the grease to flow to the front of the stove and from there to collect at one point where the grease can be directed into a storage tray, or drawer.

In most flat top cooking ranges and hot plates that have been observed, the cooking surface is made in one of two ways: it is either made in a single large unit susceptible to growth, by alternate heating and cooling, which promotes distortion and warping; or it is divided into a number of units which abut each other, leaving a plurality of cracks between the cooking units which are very difficult to keep clean and sanitary. In my present invention it is believed that I have overcome the objectionable features of these arrangements, by providing the cooking surface of a range, or hot plate, made up of smaller units which are separated from each other by an opening of sufficient width to permit a cleaning implement to be passed down between the adjoining units of the cooking surface so that the same can be cleaned at all times. Then, in order to provide a disposal means for the burnt grease and the like, I form beneath each edge of the cooking plates, a grease and food collecting trough which is inclined to the front of the range so that the collection of the grease and food particles can be easily accomplished.

The principal object of my present invention, therefore, is to provide a flat cooking top for ranges, hot plates, and the like that is characterized by being divided into a plurality of spaced units.

A further object of my invention is to provide grease-collecting channel ways disposed below the edges of my cooking unit.

A further object of my invention is to provide a downwardly extending lip or skirt around the outer margin of my separate cooking surfaces which are of such downward extent as to be below the top margin of the sides of the grease collecting channels, so that drip will always be directed into the channels.

A further object of my present invention is to provide adjustable means for the easy leveling of my cooking surfaces so that they may be easily reduced to a common plane.

A further object of my invention is to provide a longitudinal channel for collecting the grease and food particles that flow out, or that have been wiped out, of the transverse grease channels, and to conduct the grease and the like to a common disposal point.

A further object of my invention is to provide a storage and clean-out drawer, or tray, for the collecting of grease and the like which may be easily removed from the cooking unit for its convenient cleaning and for disposal of the grease collected.

A further object of my invention is to provide a convenient tool for the cleaning out of my grease directing channels.

Other and more specific objects will be apparent from the following description taken in connection with the accompanying drawings wherein Figure 1 is a perspective view of a cooking top such as might be applied to a range or hot plate and which embodies the principles of my invention.

Figure 2 is a perspective view showing the underside of one of my cooking plates.

Figure 3 is a perspective view of the clean-out tray or drawer used in my device.

Figure 4 is a top plan view of a cooking plate showing part of the cooking top broken away to better illustrate the arrangement of the grease directing channels.

Figure 5 is a cross-sectional view taken along the line 5—5 of Figure 4.

Figure 6 is a perspective view showing a typical cross-sectional view taken along one of the transverse grease directing channels, the same being broken away and sectioned to better illustrate the construction.

Figure 7 is a vertical, cross-sectional view through the cooking surface made after the teachings of my invention.

Figure 8 is a fragmentary view showing a portion of Figure 7, but with the section taken through one of the lateral grease directing channels.

Figure 9 is a vertical, cross-sectional view taken along the line 9—9 of Figure 7.

Figure 10 is a cross-sectional view taken along the line 10—10 of Figure 7.

Figure 11 is a perspective view showing the special clean-out tool found to be most convenient for cleaning out my grease and food directing channels.

Referring to the drawings throughout which like reference characters indicate like parts, 12 designates the top of my cooking unit. This I normally prefer to form as a single structure which provides the front, downwardly curved, apron portion 14, the rear shelf member at 16, and the end bars as 18 and 19. Each of the end members 18 and 19 have formed as part of its structure the lateral channels 21 and 22, respectively. Intermediate channels 21 and 22 are disposed the additional transverse channels as 24 and 25, the exact number varying with the number of units used in my cooking surface. It is to be noted, particularly from a study of Figures 6 and 8, that the transversely disposed channels are substantially flat at each of their ends as indicated at 27 and 28. The intermediate portion, however, slopes toward the front of the stove so that any material such as grease and the like, will flow down to the front longitudinal channel 30 which extends across the front of the stove. In the rear of the stove there is also a longitudinally extending channel as 32. Channels 30 and 32 connect at the lower and upper ends, respectively of the various channels 21, 22, 24, and 25.

The front channel 30 is provided at one point with an opening in its bottom as indicated at 34. This opening has disposed immediately below it, the tray, or drawer 36 which serves to catch all grease and other materials that are passed down through opening 34. The capacity of this should be sufficient that it will require only daily clean ups.

The top member 12 may be supported in any convenient manner; it may be built into a range or it may be supported on legs if the top surface is not formed as part of a range, but is used merely as a hot, or cooking plate.

The cooking surfaces are indicated at 38, 39 and 40. It will be understood, it is believed, that any reasonable number of these might be employed. Normally, it has been found that cooking, particularly in a public eating place, consists of cooking quite a variety of items; therefore, there is not only no objection to having separate cooking plates, but rather it is an advantage, in that different foods can be cooked on separate plates thus eliminating the transmittal of flavor, as would be the case were the different foods cooked on the same surface.

The construction of each of the cooking plate surfaces consists of a plane top surface with, preferably, machined edges. The edges of each of the cooking plates is provided with a depending marginal skirt as 42 that entirely encloses the unit. This skirt should be of sufficient extent that when in place, after the showings of Figures 7 and 9, the skirts will extend down and below the upper surfaces of the sides forming channels 21, 22, 24 and 25. In this manner any drip off the edge of the cooking plate will, with certainty, be deposited in the channels. There should be ample clearance, substantially as shown in the view, to take care of reasonable expansion or growth of the cooking plates so that there will never be any binding of the same through long continuous use.

Each cooking plate is provided with an interior baffle skirt as 44, which is disposed sufficiently inside of skirt 42 that there will be ample clearance between it and the outside of the walls forming the channels 21, 22, 24, and 25. This skirt serves several purposes: it prevents direct radiation of heat to the grease channels; it prevents the possibility of any of the grease getting into the heating element indicated at 46; and serves as a margin for the packing 48 employed beneath the heating element, assuming in this instance that electric heat is used. This is particularly desirable where so often it is necessary to employ a clay or asbestos filler 48.

It will be apparent, it is believed, that it is necessary for the cooking surfaces of the plates to be in a single plane, even though each be made up of a plurality of units, and to this end I have provided a plurality of leveling screws 50. These screws are preferably threaded into bosses 52 formed on the outside of the side walls of channels 21 and 22, 24 and 25, after the showing of the various figures, particularly Figure 5. As a conventient means of adjusting, the tops of the screws should either be slotted for a screw driver, as indicated at 53, or should be provided with a flattened head so that easy adjustment of the same can be effected. It will be apparent, it is believed, by adequate adjustment of the four or more such screws supporting each of the cooking plates, that the various plates can be brought to a single plane, without regard to the exact thickness of metal used in their construction.

In Figure 11 I have illustrated a tool that has been found to be most useful in cleaning my grease channels. This consists, preferably, of a metal tool having a hoe-like head 54 with a relatively thin flat shank portion 55 and a scraper portion 56 having a sharpened surface at 57, considerably wider than the body of shank 55, thus providing a shape that can fit under ledge 42 so that the upper and lower channels as 30 and 32 can be cleaned by surface 57. The channels in between the channels 21, 22, 24, and 25 are cleaned by passing the shank 55 through the slots 59 and 60 and then using the device substantially as a hoe to move any hardened grease or food particles downwardly to the collecting channel 30. It is to be understood, of course, that the head 54 must be started at the upper end, in the longitudinal channel 32. By this means all burnt grease and other products of cooking can be collected in tray 36 which is supported by the angle of support members 62, and when the grease is to be removed, the drawer may be withdrawn and cleaned.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

Having thus fully described my invention, what I claim as new and desire to secure by Letters Patent is:

1. In combination with a cooking plate of the type having a depending peripheral flange that has a secondary flange inwardly spaced therefrom and which includes heater means operable against the underside of the cooking plate within the area bounded by the secondary flange; supporting means for said cooking plate, comprising: a frame having an open mid-portion that is surrounded by a channel formed by spaced apart upright inner and outer walls and a bottom, and a plurality of support members adapted for variable vertical adjustment and carried by said frame to receive and support the cooking plate by engaging the same between the depending peripheral and secondary flanges whereby the cooking plate may move independently of the frame in a predetermined plane and said depending flanges shield the heater means and the supporting members from liquids and the like splashing into said channel.

2. A cooking unit comprising: a supporting frame having an upright wall enclosing a mid-portion of the frame and surrounded by a channel adapted to collect fluids, a cooking plate having a plane surface cooking face, said plate supported over said upright wall and covering the mid-portion of the frame enclosed thereby, screw legs on said frame wall and supporting said cooking plate whereby the latter may move independently of the frame while maintaining a predetermined plane, heater means associated with the underside of the plate within the upright wall, a baffle flange depending from said plate between the heater and the upright wall of the frame, and a peripheral flange depending from the plate into the channel.

ANTHONY L. LANG.